(12) United States Patent
D'Amico et al.

(10) Patent No.: US 7,606,334 B2
(45) Date of Patent: Oct. 20, 2009

(54) CHANNEL ESTIMATION USING PILOT SYMBOLS

(75) Inventors: Valeria D'Amico, Turin (IT); Maurizio Graziano, Turin (IT); Bruno Melis, Turin (IT); Alfredo Ruscitto, Turin (IT)

(73) Assignee: Telecom Italia S.p.A., Milan (IT)

( * ) Notice: Subject to any disclaimer, the term of this patent is extended or adjusted under 35 U.S.C. 154(b) by 602 days.

(21) Appl. No.: 10/573,830

(22) PCT Filed: Sep. 30, 2003

(86) PCT No.: PCT/EP03/10815
§ 371 (c)(1),
(2), (4) Date: Mar. 29, 2006

(87) PCT Pub. No.: WO2005/041509
PCT Pub. Date: May 6, 2005

(65) Prior Publication Data
US 2007/0036243 A1    Feb. 15, 2007

(51) Int. Cl.
*H03D 1/00* (2006.01)
*H04B 1/69* (2006.01)
*H04B 7/216* (2006.01)
(52) U.S. Cl. .................. 375/340; 375/130; 370/342
(58) Field of Classification Search .............. 375/340, 375/130, 147, 260, 347, 343, 267, 148, 324; 370/342, 441, 465; 455/50.1, 52.1, 52.3, 455/323
See application file for complete search history.

(56) References Cited

U.S. PATENT DOCUMENTS 6,154,443 A * 11/2000 Huang et al. ............. 370/210
6,580,764 B1 * 6/2003 Mochizuki ............... 375/316
6,993,308 B2 * 1/2006 Miyoshi et al. .......... 455/277.1
7,092,431 B2 * 8/2006 Maeda et al. ............. 375/144
2001/0043642 A1  11/2001 Hirata
2002/0122471 A1   9/2002 Ling
2002/0186677 A1  12/2002 Leung

OTHER PUBLICATIONS

Ylitalo, J., "Channel Estimation Study of CDMA Downlink For Fixed Beam BTS," IEEE, PIMRC 2002, vol. 1, pp. 242, 246, (2002).

(Continued)

*Primary Examiner*—Khai Tran
(74) *Attorney, Agent, or Firm*—Finnegan, Henderson, Farabow, Garrett & Dunner, L.L.P.

(57) ABSTRACT

A system for estimating the transfer function of a transmission channel such as the downlink channel in a CDMA system over which a pilot signal and a data signal are transmitted. The system includes at least one estimator for producing first and second channel estimates from the pilot signal and the data signals and a combination node for combining the first and second channel estimates to obtain final combined channel estimates. The system includes an interpolator module adapted for interpolating the second channel estimates over a basic estimation reference time to produce equal numbers of channel estimates over the basic estimation reference time derived from the data signal and the pilot signal respectively, and possibly rate adaptation modules adapted for mapping the channel estimates on the basic estimation reference time. The combination node is a summation node producing the final combined channel estimates as a sum of the first channel estimates and the interpolated second channel estimates.

34 Claims, 6 Drawing Sheets

OTHER PUBLICATIONS

Seeger, A. et al., "Antenna Weight Verification for Closed-Loop Downlink Eigenbeamforming," Globecom' 02, IEEE Global Telecommunications Conference. Conference Proceedings, Taipei, Taiwan, Nov. 17-21, 2002, IEEE Global Telecommunications Conference, New York, NY:IEEE, vol. 1 of 3, pp. 982-986, (Nov. 17, 2002).

J. Baltersee, G. et al., "Performance Analysis of Phasor Estimation Algorithms for a FDD-UMTS Rake Receiver," IEEE $6^{th}$ Int. Symp. on Spread-Spectrum Tech. & Appl., NJIT, New Jersey, pp. 476-480, (Sep. 6-8, 2000).

* cited by examiner

Fig_2
(PRIOR ART)
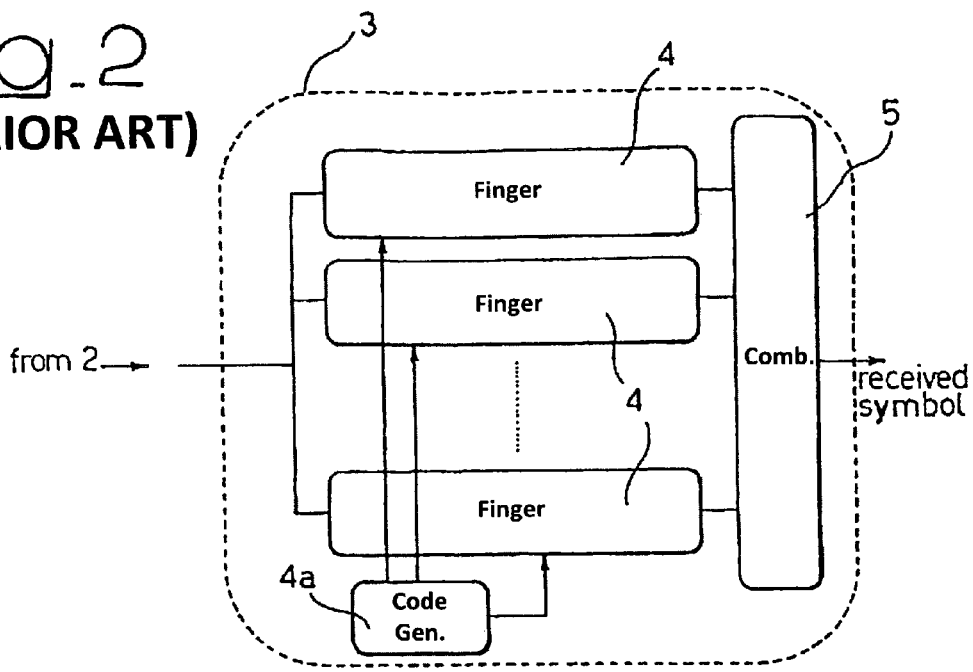
Fig_4
(PRIOR ART)
a)
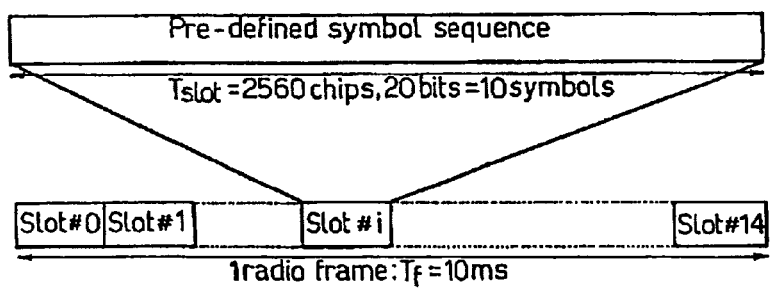
b)
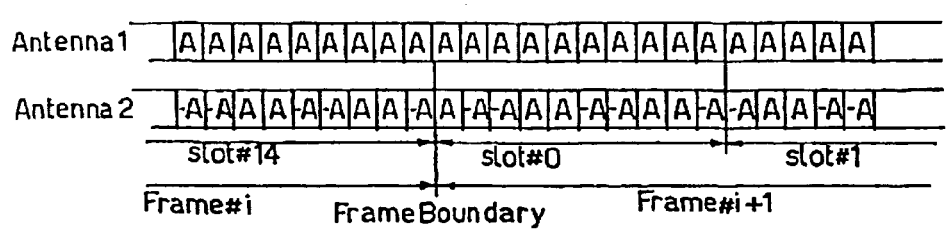

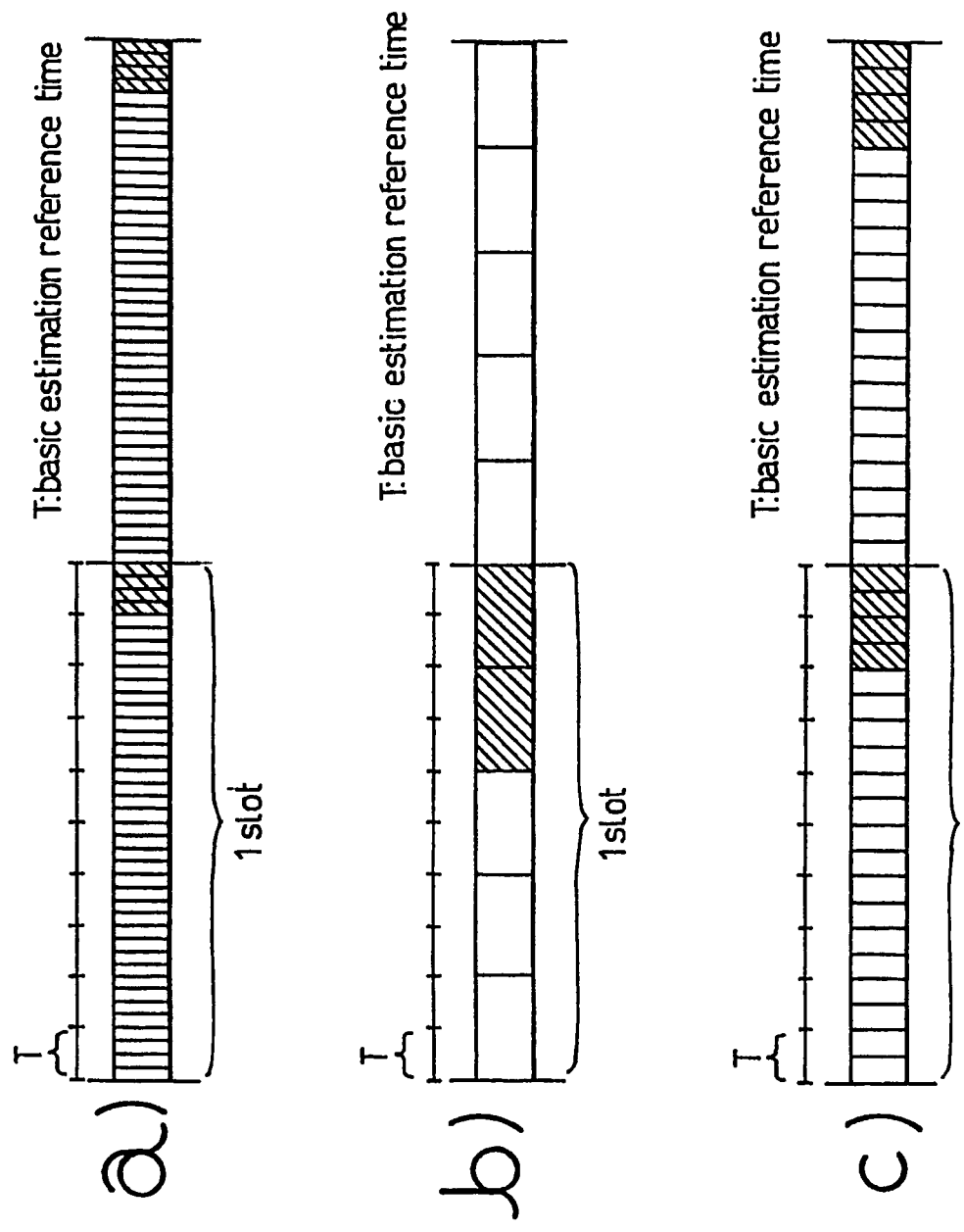
Fig._11

CHANNEL ESTIMATION USING PILOT SYMBOLS

CROSS REFERENCE TO RELATED APPLICATION

This application is a national phase application based on PCT/EP2003/010815, filed Sep. 30, 2003, the content of which is incorporated herein by reference.

FIELD OF THE INVENTION

The present invention relates to telecommunication systems and more specifically to techniques for estimating the transfer function of a transmission channel.

DESCRIPTION OF THE RELATED ART

W-CDMA (Wideband-Code Division Multiple Access) is a well known technique used in mobile radio communication systems i.a. by virtue of its high spectral efficiency as compared to other multiple access techniques.

In a W-CDMA system, a base station is associated with a respective scrambling code in order to distinguish it from other different base stations.

As schematically shown in FIG. 1, in such an arrangement a base station 1 generates a radio signal that is transmitted through a propagation channel C and reaches a remote receiving mobile terminal 2. Specifically, in FIG. 1, a mobile terminal receiver front end is shown including a RF receiver 2a, an analog-to-digital converter 2b and a digital front end 2c from which the received signal is sent to a so-called "rake" receiver better detailed in FIG. 2.

Each mobile terminal is associated to a different orthogonal spreading code. As these codes are orthogonal, a given remote terminal is able to separate its own data stream from those transmitted to the other active users. Before being transmitted from the base station 1 over the propagation channel, the signal is subject to scrambling and spreading by resorting to the codes mentioned in the foregoing.

A further distinction within CDMA systems is between those systems that use different frequencies for transmission and reception (in Frequency Division Duplex or FDD mode) and those systems that use a common frequency for both the transmission and reception but separate the signals in the time domain (in Time Division Duplex or TDD mode).

In the specific case of those networks operating according to the Universal Mobile Telecommunications System (UMTS) standard, the dispersion of the transmitted signal energy over time due to the propagation channel can be usefully exploited, by using the properties of the spreading codes, in order to separate the different received signal replicas and to recombine them constructively. As the amplitudes of the different replicas are statistically independent, such a constructive recombination increases the probability that the received signal is above the minimum level for a correct reception. This property is usually referred to as path diversity or time diversity and can be exploited by means of a "rake" receiver.

As shown in FIG. 2, a mobile terminal rake receiver 3 can be thought as a modular device including a number of independent receiving units, named "fingers" 4, each of which is "tuned" to a different received signal replica as provided by a code generator 4a. Each finger 4 in the receiver performs—by means of different processing blocks—several operations on the received signal (timing acquisition and tracking, channel estimation and compensation, frequency correction, de-scrambling, de-spreading, integration). In order to exploit path diversity, the symbol estimates at the output of the various fingers are recombined in a block 5 according to a maximum ratio combining criterion.

Within the framework of CDMA techniques, and specifically with reference to the frequency division duplex (FDD) mode, various solutions have been devised in order to increase system capacity. Among these, coherent demodulation of the signal received by the radio mobile station or mobile terminal deserves being mentioned. Coherent demodulation is used in digital communication systems when optimum error performance is of paramount importance. When employing a coherent reception scheme, channel estimation is achieved making use of known pilot symbols that are transmitted along with the data symbols.

More in detail, a number of known solutions exists for estimating the propagation channel in the specific case of the base station simultaneously transmitting towards the mobile terminal both a pilot signal and a data signal containing a pilot field.

The pilot signal is totally comprised of known symbols and transmits the same information to all users, whilst the data signal is different from user to user and comprises only a dedicated pilot field, which is time-multiplexed with the data and is known to the receiver. Channel estimation consists in exploiting these known symbols, transmitted by the base station, in order to identify essentially the phase changes introduced on the data by the propagation channel.

The slot formats adopted for the data signal and for the pilot signal in the FDD mode of the UMTS "downlink" path are shown by way of example in FIG. 3 and FIG. 4a, 4b, respectively.

The pilot signal is made of ten pilot symbols per slot, whilst the data signal may have a variable number of pilot symbols per slot depending on its spreading factor value.

When channel estimation is obtained by means of the pilot channel, the mobile terminal has knowledge of all the transmitted pilot symbols. The mobile terminal exploits these known pilot symbols to estimate the correspondent phase changes due to the propagation channel. In such a way the channel can be estimated continuously over the entire slot.

Channel estimation can be achieved also by exploiting the data signal. Observation of the slot format of the data signal makes it clear that the channel coefficients can be estimated only in correspondence of the dedicated pilot field. A problem thus arises due to the dedicated pilot symbols being transmitted only in a part of each slot. The remaining part of the slot is used for the transmission of other data so that it is not possible to estimate the channel coefficients continuously over the slot.

The pilot channel can be used to transmit common information to all the users within a cell, so its received power gradually decreases as the distance between the base station and the mobile terminal increases. On the contrary, the data signal is used to transmit individual information to a specific user. The base station 1 controls the transmission power in order to guarantee that the information will be received with the same power level independently of the position of the mobile terminal 2 with respect to the base station 1.

Various arrangements are known in the art that are capable of performing channel estimation exploiting both a pilot signal and a data signal.

By way of example, reference can be made to the arrangement described in U.S. Patent application US2001/0043642—schematically shown in FIG. 5. The arrangement in question includes devices 8a and 8b adopted to evaluate the power level of the two signals above, once basic finger operations 6 and 7 have been carried out. By comparing the respective power values calculated in the units 8a, 8b by means of a comparator 9, a selector unit 10 selects the pilot symbols with the highest power level and exploits only this signal for the channel estimation unit 11 to carry out the estimation task.

In this arrangement, the channel estimation unit operating on the pilot signal is likely to be used when the mobile terminal is close to the base station, whilst the channel estimation unit working on the data signal is likely to be used when the mobile terminal is far away from the base station. In that way essentially the same reception characteristics can be obtained no matter where the mobile terminal is positioned.

Applicants remark that the arrangement in question requests that both estimation units are implemented together with a power calculating device able to convert the two signals in the corresponding power values in order to choose the largest one by using the comparator. Even though using only one of the two estimation units at a time, the total complexity of the arrangement is made up of the sum of the complexities of both devices.

Another arrangement using both a pilot signal and a data signal is disclosed in U.S. Patent application US 2002/0186677. In that arrangement, shown by way of reference in FIG. 6, the apparatus includes a pilot filter 12 able to generate channel estimates from the pilot signal and a circuit 13 for reconstructing the data information bits. A predictive channel estimation circuit 14 generates predictive channel estimates from the reconstructed data signal, which has been reconstructed exploiting the circuit 13.

These estimates are used together with those obtained from the pilot signal to demodulate the received data via a module 15, thus achieving a higher accuracy than in the case the estimates obtained from the pilot signal alone are used.

In this arrangement the combination of the pilot signal channel estimates with the reconstructed data signal channel estimates is carried out according to quality indicators of the reconstructed data signal information bits. The predictive channel estimator, generates the predictive channel estimates from the combined pilot signal channel estimates and reconstructed data signal channel estimates. This solution achieves a higher degree of accuracy in comparison with the arrangement described in U.S. Patent application US 2001/0043642. This is however at the price of a greater complexity due to the reconstruction of the data signal and the evaluation of the quality indicators necessary for the subsequent combination task.

Another solution that exploits both a pilot signal and a data signal is described in U.S. Patent application US 2002/0122471. In the arrangement disclosed in this last cited document estimation is improved by using the data carried by different channels rather than in the pilot channel. By enabling the formation of channel estimates based on the data channel, the method is able to achieve superior channel demodulation performance. A channel estimate combiner is used to achieve a weighted average of the pilot and the data channel estimates, each scaled according to specific scaling factor values. The scaling factor values are provided to the combiner by a control processor, which evaluates these values based on the data channel quality metric. The main drawback of this solution lies in its intrinsic complexity.

OBJECT AND SUMMARY OF THE INVENTION

The prior art arrangements described in the foregoing are thus affected by essential drawbacks, such as an incomplete exploitation of the two channels (pilot and data), or an extremely complex structure that makes hardware implementation rather difficult.

The object of the present invention is thus to provide an improved arrangement dispensing with those drawbacks.

According to the present invention, that object is achieved by means of a method having the features set forth in the claims that follows. The invention also relates to a corresponding system (adapted to be included e.g. in a CDMA receiver) as well as a related computer program product loadable in the memory of at least one computer and including software code portions for performing the steps of the method of the invention when the product is run on at least one computer.

Preferred embodiments of the arrangement described herein comprise a method and a device for the estimation of the transfer function of a transmission channel having both a pilot signal and a data signal which contains a dedicated pilot field. The preferred embodiments in question are based on a low complexity arrangement, for the estimation of the transfer function of a transmission channel. These embodiments are particularly suitable for use in connection with transmission paths supplied with a pilot signal and a data signal containing a pilot field as is e.g. the case of the transmission path toward a mobile terminal, called "down-link", in a mobile communication system.

A preferred embodiment of the arrangement described herein achieves an automatic maximum ratio combination between the two above signals without introducing any processing overhead.

BRIEF DESCRIPTION OF THE ENCLOSED DRAWINGS

The invention will now be described, by way of example only, by referring to the enclosed figures of drawing, wherein:

FIGS. 1 to 6, related to the prior art, have been already described in the foregoing;

FIG. 11 is an example of a rate adaptation unit procedure in three different slot formats adopted in the arrangement described herein.

DESCRIPTION OF PREFERRED EMBODIMENTS OF THE INVENTION

An exemplary embodiment of the invention will now be described in an application that is specific but not limited to the estimation of the propagation channel in a W-CDMA system such as the UMTS downlink path.

Figure 1:
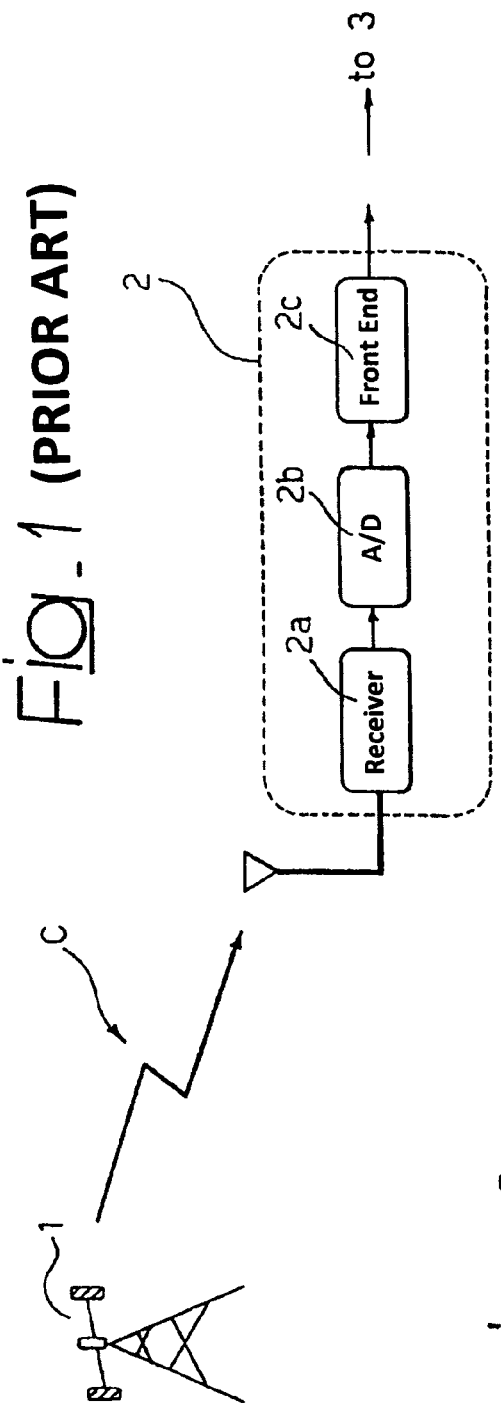

The channel estimation arrangement described herein is adapted to derive an estimate of the propagation channel C between a base station 1 and a mobile terminal 2 (see FIG. 1) when considering e.g. a UMTS system operating in FDD mode in its downlink path. If transmit diversity is employed by using two transmit antennas in the base station 1, both such fading channels will be estimated in the mobile terminal 2.

Figure 7:
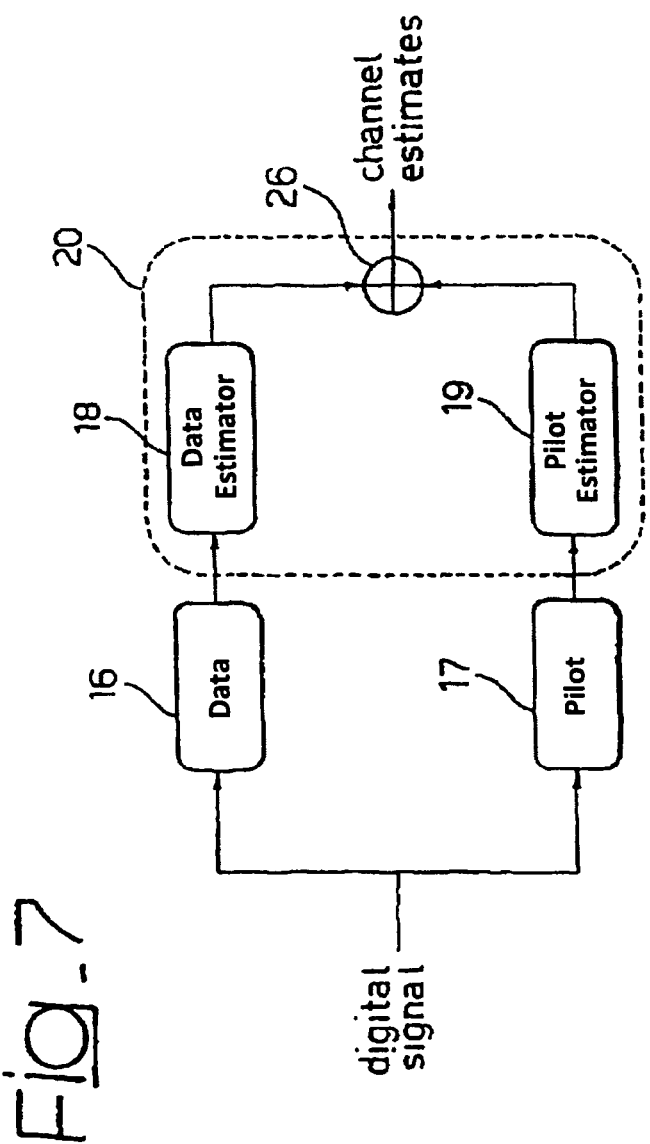
FIG. 7 is a functional block diagram of apparatus exemplary of the arrangement described herein.

Since a coherent reception scheme is employed, channel estimation is achieved making use of known pilot symbols that are transmitted along with the data symbols. When considering the specific case of the UMTS-FDD system, the estimation operation exploits both the Dedicated Physical CHannel (DPCH) and the Primary Common Pilot CHannel (P-CPICH). The downlink channel estimation described herein is simultaneously carried out on both the above channels as shown in FIG. 7.

The respective "fingers" in the receiver are designated 16 (data), and 17 (pilot), respectively.

Within the downlink DPCH dedicated data generated at higher layers are transmitted in time multiplex with control information generated at the physical layer. Hence a certain number of known pilot bits is transmitted. The P-CPICH is a fixed rate downlink physical channel, with a fixed spreading factor equal to 256, which carries a pre-defined sequence.

On the DPCH, the spreading factor is not fixed, and a different number of estimates, evaluated on a different reference time period, are derived according to the specific slot format used, by exploiting the data signal estimation unit 18.

Conversely, the P-CPICH is a fixed rate channel; it is thus possible to extract therefrom a fixed number of estimates per slot, each of which is evaluated on a basic P-CPICH reference time period by exploiting the pilot signal estimation unit 19. A basic estimation reference time T is chosen and the P-CPICH channel estimates are eventually mapped on this time basis.

Figure 8:
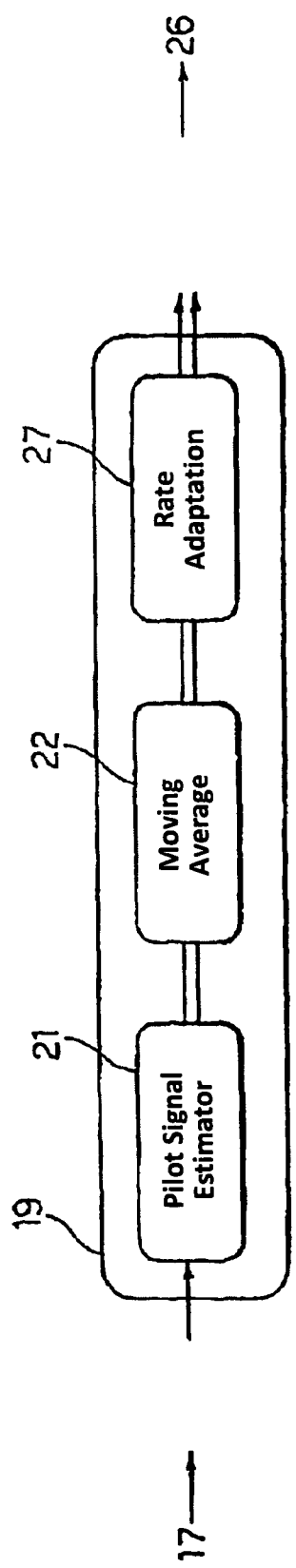
FIGS. 8 and 9 are functional block diagrams of the pilot signal estimation unit and the data signal estimation unit, respectively, included in the apparatus of FIG. 7.

Referring to FIG. 8, that details the internal structure of the estimation unit 19, it is possible to increase the estimation accuracy carried out on the pilot signal estimator proper, designated 21, by exploiting an optional moving average block 22. This optional block performs a moving average on a certain number of consecutive channel estimates of the P-CPICH that have been derived by means of the pilot signal estimator 21. Each channel estimate (present) is averaged with the previous (past) and with the subsequent ones (future). A rate adaptation unit 27 may be possibly cascaded to the block 22 for reasons that will become clear in the following.

Figure 9:
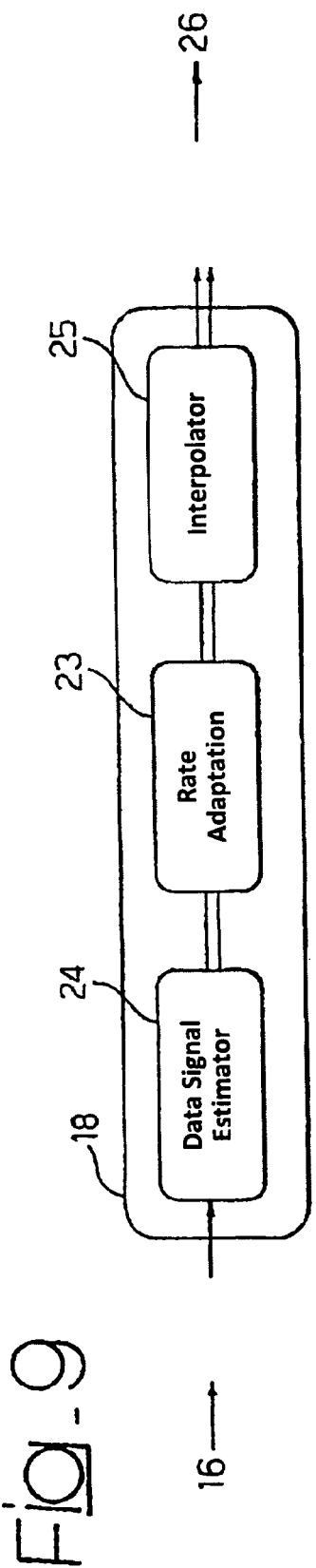

Referring to FIG. 9, the data signal channel estimates are referred to a basic estimation reference time T that in the following will be assumed to be equal to the basic (respective) DPCH reference time period. Those of skill in the art will promptly appreciate that such an assumption is being made primarily for the sake of simplicity of illustration and is in no way a mandatory choice.

If the basic DPCH reference time period is different from the basic estimation reference time, the rate adaptation unit 23 can be possibly used in the unit 18 downstream of the data signal estimator 24. This unit maps the estimates derived from the data signal on the basic estimation reference time. In that way also the values of the channel estimates obtained on the data signal will be referred to the same basic estimation reference time.

Since on the DPCH the channel coefficients can be estimated only in correspondence of the pilot symbols, the channel coefficients cannot be estimated continuously over one slot. In order to estimate the channel coefficients in the remaining part of every slot, after the rate adaptation unit 23, interpolation is required.

A preferred arrangement uses a kind of interpolation operating between the channel estimates obtained from the pilot field within the current slot L and the channel estimates obtained from the pilot field of the previous slot L-1. An interpolator module 25 performs an interpolation (such as e.g. a linear interpolation or an interpolation based on Lagrange polynomials) thus bringing the number of estimates per slot evaluated on the DPCH equal to those evaluated on the P-CPICH.

A fixed number of estimates will be drawn out on both channels, whatever slot format is being used. These estimates are evaluated in such a way to be proportional to their own power level and hence, implicitly, to their own reliability. It follows that if these estimates are summed together (and this is feasible since they are both referred to the same basic reference time period) a maximum ratio combining will be automatically achieved, without the need of any further processing and hence any increase in the system complexity.

Moreover, when adopting this arrangement, a notable enhancement in system performance is achieved in comparison to the prior art, as for example when exploiting only one of the channels as in U.S. Patent application US2001/0043642 referred to in the foregoing. This improvement is obtained without any need of quality indicators and/or further processing which would inevitably increase system complexity as is the case of the arrangements shown e.g. in U.S. Patent applications US2002/0186677 or US2002/0122471.

Figure 10:
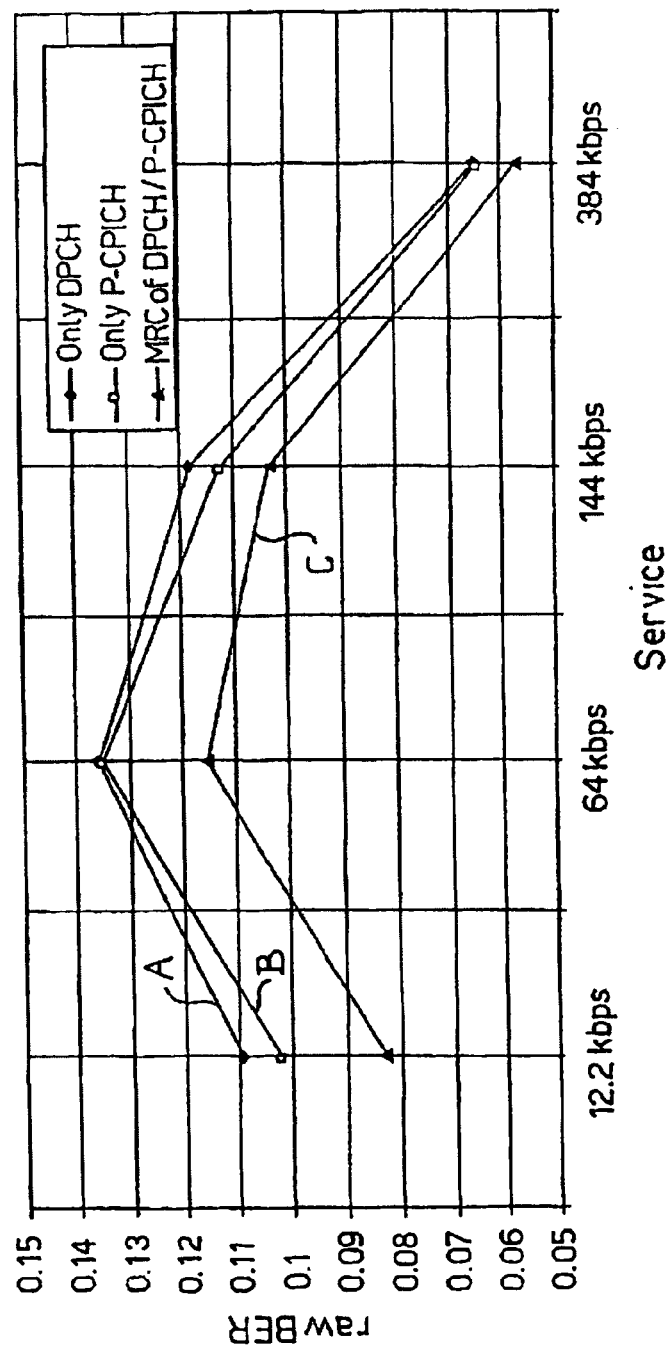
FIG. 10 is a performance graph, expressed in terms of raw BER at the output of a mobile terminal rake receiver, showing the performance achieved by means of the arrangement described herein.

An enhancement in system performance (expressed in terms of raw BER measured at the output of the inner modem) is achieved for all UMTS conformance test services when using the combination of both the two channel estimates as shown in FIG. 10. Specifically, in the graph of FIG. 10 the curves designated A and B refer to the performance of systems where channel estimation is performed on the basis of the DPCH and the P-CPICH signal, respectively. The curve designated C refers to the arrangement described herein.

More in detail, the arrangement described herein exploits both the Dedicated Physical CHannel (DPCH) and the Primary Common Pilot CHannel (P-CPICH): the channel estimates thus obtained are fed to an automatic maximum ratio combiner that exploits both such estimates. If transmit diversity is employed by using two transmit antennas in the base station, both such fading channels are estimated in the mobile terminal rake receiver.

In the arrangement described herein two different signals are exploited independently to derive the channel estimates. These estimates are easily processed in order to refer them to the same basic estimation reference time and are made proportional to their own power levels and hence their own degrees of reliability. Once this is done, the estimates coming from the two different signals are summed together, yielding an overall channel estimate that is more accurate than the single estimates alone.

Before proper channel estimation can be achieved, the first tasks to be accomplished are the operations performed within the rake receiver finger as shown in FIG. 2. Within the fingers 4 the operations of descrambling, despreading, integrate-and-dump are performed in order to separate the different transmitted channels at the receiving end.

The Primary Common Pilot Channel (P-CPICH) of the UMTS-FDD system is a fixed rate downlink physical channel with a spreading factor equal to 256 that carries a pre-defined sequence. The frame structure of the downlink CPICH is shown in FIG. 4a. When employing transmit diversity, the pre-defined symbol sequence of the CPICH is different for the two antennas as shown in FIG. 4b.

It is possible to estimate the channel characteristics by exploiting this known pre-defined sequence.

Referring again to FIG. 7, after the descrambling, despreading and integrate-and-dump operations have been carried out within the pilot finger 17, the symbols are fed to the pilot signal estimation unit 19. This block knows the exact pilot sequences that have been actually transmitted on the pilot signal.

The overall pilot signal estimation unit 19 is shown in FIG. 8.

The decoding strategy is the following: the symbols received from the pilot finger 17 are decoded over a certain time epoch, i.e. the P-CPICH decoding time epoch, by correlating them with the stored reference pilot symbols within the pilot signal estimator 21.

For example, if transmit diversity is active, the P-CPICH decoding time epoch of the P-CPICH signal of the UMTS-FDD system is equal to 512 chips while, if transmit diversity is not active, the P-CPICH decoding time epoch of the P-CPICH signal of the UMTS-FDD system is equal to 256 chips.

In the following a "basic estimation reference time" T is chosen and represents the time basis on which the estimates coming from the two different signals will always be mapped, in order to ensure a true automatic maximum ratio combination of the same.

The pilot channel estimates thus obtained are returned at the output and eventually fed to the optional moving average unit 22. This optional operation is able to increase the estimation accuracy of the pilot signal estimates by performing a moving average on a certain number of consecutive channel estimates that have been derived by means of the pilot signal estimator 21. Each channel estimate (present) is averaged with a certain number of previous (past) and subsequent ones (future). If the block 22 is introduced in the system, the moving average operation introduces an additional latency in the system, but on the other hand increases the estimation accuracy and hence improves the system performance.

The rate adaptation block 27 of FIG. 8 is an optional block. When present, it is intended to guarantee that the overall pilot signal estimation unit 19 always returns a fixed number of estimates per slot, each referred to the basic estimation reference time. This is done by splitting or integrating different subsequent estimates, in order to reach the basic estimation reference time duration. If the block 27 is dispensed with, the system is able to work only in the specific case where the channel estimates from the pilot signal and the data signal are already based on the same time reference and this time reference is equal to the selected basic estimation reference time.

For example, due to the presence of transmit diversity, the pilot signal estimator 21 may return fewer estimates per slot, each evaluated on a larger decoding time epoch. In that case, each significant value is split within the pilot signal rate adaptation block 27 in order to be referred, after the splitting, to the basic estimation reference time. The pilot channel estimates, which have been eventually averaged within block 22 and rate adapted within block 27, are fed to the adder 26. The overall cascade of blocks 18, 19 and 26 makes up the automatic MRC combiner 20.

Figure 3:
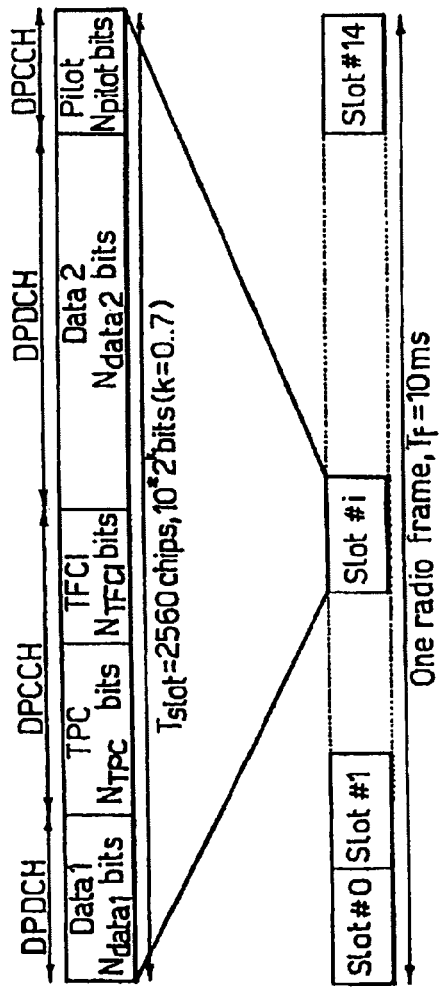
Figure 5:
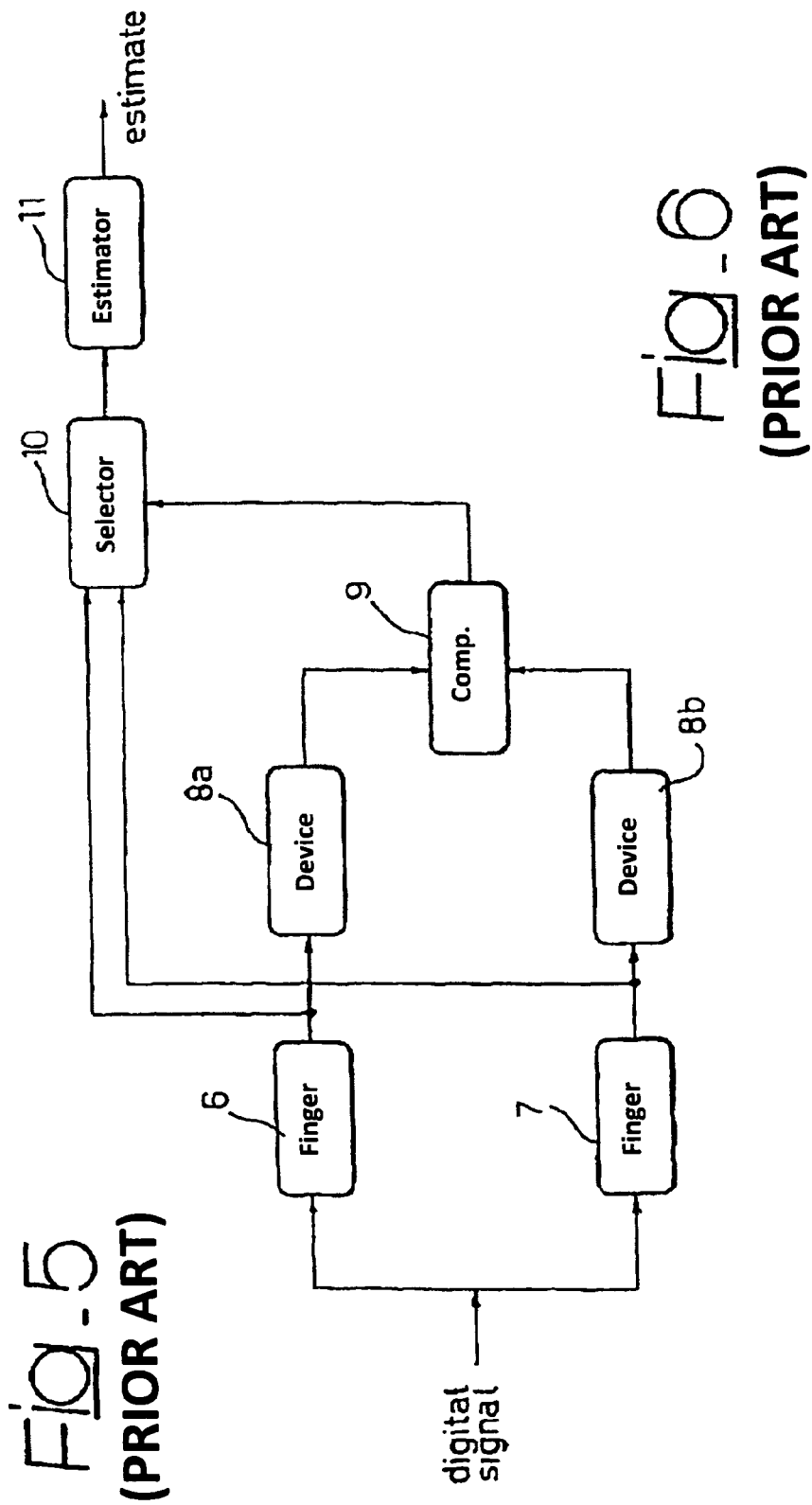
Figure 6:
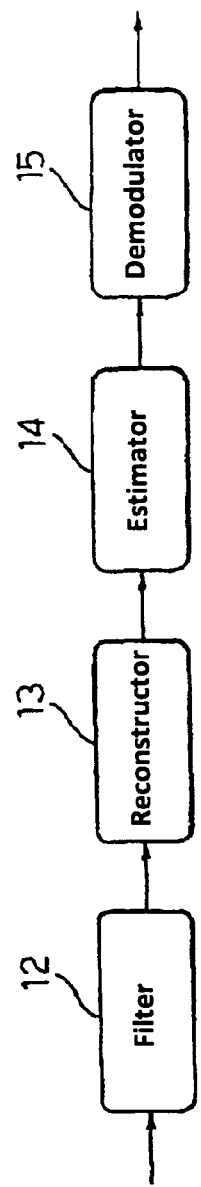

Within the downlink Dedicated Physical Channel (DPCH) of the UMTS-FDD system dedicated data generated at higher layers is transmitted in time multiplex with control information generated at the physical layer. The frame structure of the downlink DPCH is shown in FIG. 3.

Each frame of length 10 ms is split into 15 slots, each of length $T_{slot}$=2560 chips, corresponding to one power-control period. Within the aforementioned control information, a certain number of known pilot bits are transmitted (besides TPC commands and an optional TFCI). These pilots are used for the estimation of the transmission channel characteristics. According to the different slot format that is adopted, different pilot bit patterns are used.

Referring to FIG. 7, after the descrambling, despreading and integrate-and-dump operations have been carried out within the data finger 16, the next task is to extract the time-multiplexed pilot symbols from the entire slot structure. This is easily done since the data signal frame structure is known at the receiver.

After extraction from the received sequence, the pilot field symbols are fed to the data signal estimation unit 18. This block knows the exact pilot sequences that have been actually transmitted on the data signal. Exploiting the knowledge of the pilot bits, the channel phases can be estimated.

The overall data signal estimation unit 18 is shown in FIG. 9. After extraction from the received sequence, the pilot field symbols are fed to the first block of the data signal estimation unit 18, named data signal estimator 24. This block has knowledge of the pilot sequence that has been actually transmitted on the data signal by the base station 1. If transmit diversity is used in the base station 1, the data signal estimator 24 has knowledge of both the antenna patterns. Exploiting the knowledge of both these pilot patterns, the channel phases will be estimated.

The decoding strategy is the following: the symbols received from the data finger 16 are decoded over a certain time epoch, i.e. the DPCH decoding time epoch, by correlating them with the stored reference pilot symbols within the data signal estimator 24. In the specific case of the UMTS-FDD system, when transmit diversity is active the DPCH decoding time epoch is equal to the entire pilot field, while when transmit diversity is not active, the DPCH decoding time epoch is equal to one DPCH pilot symbol duration. The data channel estimates thus obtained are returned at the output and fed to the rate adaptation unit 23.

The overall data signal estimation unit 18 is implemented in such a way that it always returns a number of estimates per slot equal to the number of estimates per slot derived from the pilot signal estimation unit 19. Each of these estimates is evaluated on the basic estimation reference time.

Referring to FIG. 9, this is achieved by first exploiting the rate adaptation unit 23 that maps the data signal channel estimates on the basic estimation reference time (no matter what spreading factor is used on the data signal) and then, in the subsequent interpolator unit 25, by performing interpolation in the remaining part of the slot in order to reach the fixed number of estimates per slot.

The rate adaptation unit 23 may operate in several different manners, according to the different operations that must be done to map the data signal estimates on the basic estimation reference time. The working modalities of the rate adaptation unit 23 basically depend on two quantities whose value must be pre-analyzed:

the ratio of the data signal overall pilot field to the basic estimation reference time, henceforth referred to as "kappa", and the ratio of the data signal spreading factor value to the basic reference spreading factor value, henceforth referred to as "gamma".

The basic reference spreading factor is defined as the number of chips within the basic estimation reference time T.

The rate adaptation algorithm implemented in module 23 works on a slot basis and consists of the following steps.

First of all the value of kappa must be checked.

If kappa$\leq$1, the length of the data signal pilot field is smaller (i.e. shorter) than or equal to the basic estimation reference time T. In this case, integration is carried out on the data signal channel estimates in order to be mapped to the basic estimation reference time. The so-obtained integrated channel estimate is returned at the output. An example of this case is shown in FIG. 11a.

If kappa>1, the length of the data signal pilot field is greater (i.e. longer) than the basic estimation reference time T. In this case the estimates are split, converting them to the basic estimation reference time basis. Two different situations may occur in this case (according to the value of gamma). At this point the value of gamma must be checked.

If gamma≧1, the single generic data signal channel estimate has been evaluated over a DPCH decoding time epoch that is larger than or equal to the basic estimation reference time T. It should hence be split to a basic estimation reference time basis. The so-obtained split channel estimates are returned at the output. An example of this case is shown in FIG. 11b.

If gamma<1, the single generic data signal channel estimate has been evaluated over a DPCH decoding time epoch that is smaller than the basic estimation reference time T. It should hence be integrated on a basic estimation reference time basis. The so-obtained integrated channel estimates are returned at the output. An example of this case is shown in FIG. 11c.

It will be appreciated that the same processing steps exemplified above in connection with the data signal pilot field can be performed also for the pilot signal if the basic CPICH reference time period is different from the basic estimation reference time T.

The rate adaptation unit 23 works also in the presence of transmit diversity.

When referring, as in FIG. 3, to a data signal containing only a dedicated pilot field, time-multiplexed with the information data, for the channel estimation task, it is clear that the channel coefficients can be estimated only in correspondence of the pilot field. It follows that it is not possible to estimate the channel coefficients continuously over one slot.

In order to estimate the channel coefficients in the remaining part of every slot, after the optional rate adaptation unit 23 shown in FIG. 9, interpolation is required. The basic idea consists in using a kind of interpolation operating between the channel estimates obtained from the pilot field within the current slot and the channel estimates obtained from the pilot field of the previous slot. The interpolator 25 performs an interpolation, by means of a given algorithm of any known type, in order to evaluate the missing channel estimates, each referred to the basic estimation reference time, thus bringing the number of estimates per slot up to the fixed value. In such a way the number of estimates per slot evaluated on the data signal is equal to the number of estimates per slot evaluated on the pilot signal.

Referring once again to FIG. 7, after the estimation operations 18 and 19 have been carried out both on the data signal and on the pilot signal, the adder 26 receives the same number of estimates per slot, each evaluated on the basic estimation reference time, from both these estimation units. By simply summing, on a basic estimation reference time basis, the channel estimates together brings to a maximum ratio combination of the same. This is achieved automatically, without the need of further processing and/or without increasing in the system complexity, since the amplitudes of the estimates and thus their reliability, are proportional to the spreading factor and to the power of each received channel estimate.

It is thus evident that, the basic principles of the invention remaining the same, the details and embodiments may widely vary with respect to what has been described and illustrated purely by way of example, without departing from the scope of the presented invention as defined in the annexed claims.

This applies i.a. to the possibility of making the sum performed at the summation node 26 of FIG. 7 a weighted sum of the estimates derived from the pilot signal estimation unit 19 and the data signal estimation unit 18, and the possibility of dispensing with the step of mapping the channel estimates derived from the data signal and/or the pilot signal over the basic estimation reference time.

The invention claimed is:

1. A method for estimating in a mobile telecommunications terminal a transfer function of a transmission channel over which a pilot signal and a data signal are transmitted to the terminal, said pilot signal comprising sets of known symbols each transmitted over a given time slot, and said data signal comprising dedicated pilot fields comprising respective sets of known symbols each transmitted over a respective time slot, comprising, within the mobile telecommunications terminal:
    obtaining first and second channel estimates from said pilot signal and said data signal, respectively, received by the terminal;
    combining said first and second channel estimates to obtain final combined channel estimates;
    obtaining said first and second channel estimates over a basic estimation reference time;
    interpolating said second channel estimates over said basic estimation reference time to produce a number of interpolated second channel estimates over said basic estimation reference time derived from said data signal equal to the number of said first channel estimates over said basic estimation reference time derived from said pilot signal; and
    obtaining said final combined channel estimates as a sum of said first channel estimates and said interpolated second channel estimates.

2. The method of claim 1, comprising mapping at least one of said first and second channel estimates onto said basic estimation reference time.

3. The method of claim 1, comprising:
    obtaining said first channel estimates over a respective estimation reference time; and
    selecting said basic estimation reference time equal to said respective estimation reference time.

4. The method of claim 3, comprising mapping said second channel estimates onto said respective estimation reference time.

5. The method of claim 1, comprising obtaining said final combined channel estimates as a weighted sum of said first channel estimates and said interpolated second channel estimates.

6. The method of claim 2, wherein said mapping comprises:
    integrating said at least one of said first and second channel estimates over said basic estimation reference time if the length of said given time slot or respective time slot is shorter than said basic estimation reference time;
    splitting said at least one of said first and second channel estimates over a plurality of said basic estimation reference times if the length of said given time slot or respective time slot is longer than said basic estimation reference time.

7. The method of claim 6, wherein said splitting comprises:
    splitting said at least one of said first and second channel estimate into corresponding estimates associated to a plurality of said basic estimation reference times if said at least one of said first and second channel estimates have been evaluated over a slot larger than said basic estimation reference time; and integrating said at least one of said first and second channel estimates over said basic estimation reference time if said at least one of said first and second channel estimates has been evaluated over a slot smaller than said basic estimation reference time.

8. The method of claim 1, wherein said interpolation is a linear interpolation.

9. The method of claim 1, wherein said interpolation is an interpolation of second channel estimates obtained from two subsequent dedicated pilot fields in said data signals.

10. The method of claim 1, wherein said first channel estimates are obtained by decoding said known symbols associated with a pilot signal over a given decoding time epoch by correlating them with reference pilot symbols.

11. The method of claim 10, wherein said decoding comprises:
  if transmit diversity is adopted for said transmission channel, performing said correlation over a time equal to twice said decoding time epoch; and
  if transmit diversity is not adopted for said transmission channel, performing correlation over a time equal to said decoding time epoch.

12. The method of claim 1, wherein said second channel estimates are obtained from said data signals by decoding said dedicated pilot fields over a plurality of subsequent data symbols equal to a respective decoding time epoch and by correlating said decoded data symbols with reference data pilot symbols.

13. The method of claim 12, wherein said decoding comprises:
  if transmit diversity is active over said transmission channel, performing said correlation over the entire respective decoding time epoch; and
  if transmit diversity is not active over said transmission channel, performing said correlation on a symbol-by-symbol basis.

14. The method of claim 1, wherein said obtaining said first channel estimates from said pilot signal comprises performing a moving average operation over estimates of said pilot signal.

15. The method of claim 2, wherein said obtaining said first channel estimates from said pilot signal comprises performing a moving average operation over estimates of said pilot signal, wherein said mapping operation is performed downstream of said moving average operation.

16. The method of claim 1, wherein said transmission channel is a CDMA transmission channel.

17. A system for estimating the transfer function of a transmission channel over which a pilot signal and a data signal are transmitted, said pilot signal comprising sets of known symbols each transmitted over a given time slot, and said data signal comprising dedicated pilot fields comprising respective sets of known symbols each transmitted over a respective time slot, comprising:
  at least one estimator for producing first and second channel estimates from said pilot signal and said data signal, respectively;
  a combination node for combining said first and second channel estimates to obtain final combined channel estimates, said at least one estimator being configured for obtaining said first and second channel estimates over a basic estimation reference time; and
  an interpolator module for interpolating said second channel estimates over said basic estimation reference time to produce a number of interpolated second channel estimates over said basic estimation reference time derived from said data signal equal to the number of said first channel estimates over said basic estimation reference time derived from said pilot signal, said combination node being a summation node producing said final combined channel estimates as a sum of said first channel estimates and said interpolated second channel estimates.

18. The system of claim 17, comprising at least one rate adaptation module configured for mapping at least one of said first and second channel estimates onto said basic estimation reference time.

19. The system of claim 17, wherein said at least one estimator is configured for obtaining said first channel estimates over a respective estimation reference time, and said interpolator module is configured for interpolating said second channel estimates over a basic estimation reference time equal to said respective estimation reference Urns.

20. The system of claim 19, comprising a rate adaptation module configured for mapping said second channel estimates onto said respective estimation reference time.

21. The system of claim 17, wherein said combination node is a weighted summation node producing said final combined channel estimates as a weighted sum of said first channel estimates and said interpolated second channel estimates.

22. The system of claim 18, wherein said at least one rate adaptation module is configured for performing said mapping by:
  integrating said at last one of said first and second channel estimates over said basic estimation reference time if the length of said given time slot or respective time slot is shorter than said basic estimation reference time; and
  spitting said at last one of said first and second channel estimates over a plurality of said basic estimation reference times if the length of said given time slot or respective time slot is longer than said basic estimation reference time.

23. The system of claim 22, wherein said at least one rate adaptation module is configured for:
  spitting said at least one of said first and second channel estimates into corresponding estimates associated with a plurality of said basic estimation reference times if said at least one of said first and second channel estimates has been evaluated over a slot larger than said basic estimation reference time; and
  integrating said at least one of said first and second channel estimates over said basic estimation reference time if said at least one of said first and second channel estimates has been evaluated over a slot smaller than said basic estimation reference time.

24. The system of claim 17, wherein said interpolator module is a linear interpolator module.

25. The system of claim 17, wherein said interpolator module is configured for performing an interpolation of second channel estimates obtained from two subsequent dedicated pilot fields in said data signals.

26. The system of claim 17, wherein said at least one estimator module is configured for producing said first channel estimates by decoding said known symbols associated with the pilot signal over a given decoding time epoch by correlating them with reference pilot symbols.

27. The system of claim 26, wherein said at least one estimator module is configured for:
  if transmit diversity is adopted for said transmission channel, performing said correlation over a time equal to twice said decoding time epoch; and
  if transmit diversity is not adopted for said transmission channel, performing correlation over a time equal to said decoding time epoch.

28. The system of claim 17, wherein said at least one estimator module is configured for producing said second channel estimates from said data signals by decoding said dedicated pilot fields over a plurality of subsequent data symbols equal to a respective decoding time epoch and by correlating said decoded data symbols with reference data pilot symbols.

29. The system of claim 28, wherein said at least one estimator module is configured for:
 if transmit diversity is active over said transmission channel, performing said correlation over the entire respective decoding time epoch; and
 if transmit diversity is not active over said transmission channel, performing said correlation on a symbol-by-symbol basis.

30. The system of claim 17, wherein said at least one estimator module for producing said first channel estimates from said pilot signal includes a moving average module for performing a moving average operation over estimates of said pilot signal.

31. The system of claim 18, wherein said at least one estimator module for producing said first channel estimates from said pilot signal comprises a moving average module for performing a moving average operation over estimates of said pilot signal and said rate adaptation module is arranged downstream of said moving average module.

32. A receiver for receiving digital signals over a transmission channel over which a pilot signal and a data signal are transmitted, said pilot signal comprising sets of known symbols each transmitted over a given time slot, and said data signal comprising dedicated pilot fields comprising respective sets of known symbols each transmitted over a respective time slot, comprising a system according to claim 17, 18, or 20.

33. The receiver of claim 32, wherein said receiver is a CDMA receiver.

34. A computer-readable medium storing a program product for execution on a processor, the computer program product comprising software code portions for performing the method of any one of claims 1 to 16 when executed by the processor.

* * * * *

UNITED STATES PATENT AND TRADEMARK OFFICE
CERTIFICATE OF CORRECTION

| | | |
|---|---|---|
| PATENT NO. | : 7,606,334 B2 | Page 1 of 1 |
| APPLICATION NO. | : 10/573830 | |
| DATED | : October 20, 2009 | |
| INVENTOR(S) | : D'Amico et al. | |

It is certified that error appears in the above-identified patent and that said Letters Patent is hereby corrected as shown below:

Claim 19, column 12, line 16, "Urns" should read --time--.

Claim 22, column 12, line 31, "spitting said at last" should read --splitting at least--.

Claim 23, column 12, line 38, "spitting" should read --splitting--.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,606,334 B2 | Page 1 of 1 |
| APPLICATION NO. | : 10/573830 | |
| DATED | : October 20, 2009 | |
| INVENTOR(S) | : Valeria D'Amico et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 602 days.

should read (*) Notice: Subject to any disclaimer, the term of this patent is extended or adjusted under 35 U.S.C. 154(b) by 806 days.

Claim 19, column 12, line 16, "Urns" should read --time--.

Claim 22, column 12, line 31, "spitting said at last" should read --splitting said at least--.

Claim 23, column 12, line 38, "spitting" should read --splitting--.

This certificate supersedes the Certificate of Correction issued June 8, 2010.

Signed and Sealed this

Twenty-fourth Day of August, 2010

David J. Kappos
*Director of the United States Patent and Trademark Office*